May 9, 1933.  A. F. GARDNER  1,908,137

OIL SEAL

Filed Sept. 30, 1931

Inventor:
Allen F. Gardner,
By Cromwell, Greist & Warden
attys.

Patented May 9, 1933

1,908,137

UNITED STATES PATENT OFFICE

ALLEN F. GARDNER, OF DETROIT, MICHIGAN, ASSIGNOR TO CHICAGO RAWHIDE MANUFACTURING COMPANY, OF CHICAGO, ILLINOIS, A CORPORATION OF ILLINOIS

OIL SEAL

Application filed September 30, 1931. Serial No. 566,069.

This invention has to do with oil seals of the type used in the ends of oil-filled housings about moving shafts for the purpose of retaining the oil in the housings and preventing it from leaking out along the shafts.

The object of the invention is to provide a self-contained oil seal unit of the type described which is very inexpensive to manufacture, will stand up under hard and continuous service, and will give an efficient sealing action.

Another object of the invention is to provide a self-contained unit which includes a packing element which is comparatively quite small in size.

While the foregoing statement is indicative in a general way of the nature of the invention, other more specific objects and advantages will be apparent to those skilled in the art upon a full understanding of the construction, arrangement and function of the parts combined to produce the improved seal.

In order that the invention may be readily understood, one form of the same is presented herein, but it will of course be appreciated that the invention is susceptible of embodiment in other structurally modified forms coming equally within the scope of the appended claims.

Figure 1:
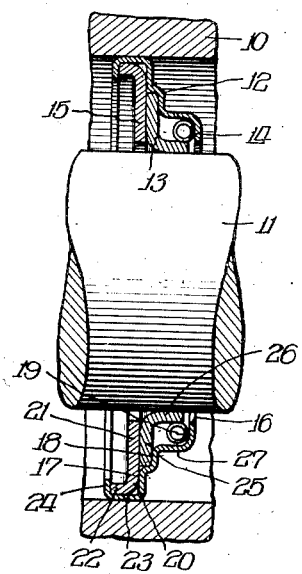
Fig. 1 is a diametric section through the improved seal, showing the same in operative position within a housing about a shaft.
Figure 2:
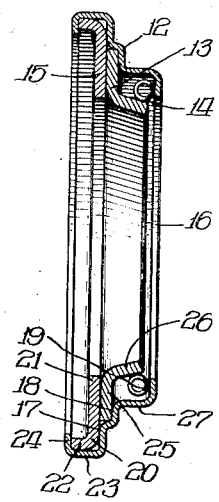
Fig. 2 is a similar section through the seal, showing the same before being installed.
Figure 3:
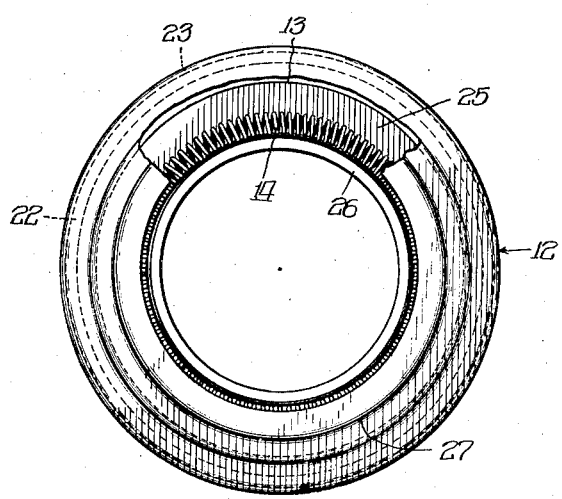
Fig. 3 is a partially broken away end view of the seal.

The improved seal—like other seals of the same type—is adapted to be positioned in a tubular housing 10 in encompassing relation to a centrally located shaft 11. The seal consists of a cage 12, a packing 13, a spring 14 and a washer 15.

The cage 12 is a cup-shaped sheet metal stamping in which the other parts of the seal are contained. The bottom of the cage is centrally apertured at 16, in order to fit about the shaft 11, with a certain amount of radial clearance. The cage contains three axially spaced annular seats 17, 18 and 19 which are progressively smaller in diameter.

The washer 15 is positioned in the cage 12 with the outer portion 20 of the washer in engagement with the largest seat 17 of the cage and with the inner portion 21 of the washer projecting inwardly a considerable distance beyond the inner edge of such seat.

The washer is provided at its outer periphery with an axially extending flange 22 which projects away from the seat 17, and the cage 12 is provided about the outer edge of the seat 17 with an axially extending cylindrical portion 23 which encases the flange 22 on the washer and terminates in an inturned rim 24 which abuts against the edge of the flange 22 and holds the washer in position.

The packing 13—which is preferably made of sheet leather and is provided with both a radially extending portion 25 and an axially extending portion 26—is quite a bit smaller than either the cage or the washer and is positioned in the cage with the radially extending portion 25 thereof clamped under pressure between the intermediate seat 18 and the inwardly projecting portion 21 of the washer. The axially extending portion 26 of the packing—which is intended to fit snugly about the shaft 11 and is preferably of conical form before being distended by the shaft—projects toward the small seat 19 in the bottom of the cage and is protected at all times by the encompassing portion 27 of the latter, which portion is preferably made cylindrical in form.

The spring 14—which is preferably made in the form of an endless coil—fits about the axially extending portion 26 of the packing in abutment with the seat 19 in the cage.

The above described oil retainer is constructed and assembled as a complete unit separate and apart from the members which it is adapted to seal. To install the device, it is merely necessary to insert the same in the housing to be sealed, with the cylindrical portion 23 of the cage 12 in fluid-tight and preferably forced fit engagement with the inside wall of the housing. In some types of installations, where the housing is relatively small, the same sized device may be used with such a housing by fitting the smaller cylindrical portion 27 of the cage tightly into the housing and allowing the larger portion 23 to abut with and project from the end of the housing.

I claim:

1. As an article of manufacture, a self-contained seal for application as an assembled unit to a housing in encompassing relation to a centrally located shaft, consisting of a centrally apertured sheet metal cage which contains annular seats of different diameters, a washer which is fastened in the cage against the largest seat, a packing of considerably smaller diameter than the washer which is clamped in the cage against the next seat by the inner portion of the washer, and a spring which encircles the inner portion of the packing and is positioned against the smallest seat.

2. As an article of manufacture, a self-contained seal for application as an assembled unit to a housing in encompassing relation to a centrally located shaft, consisting of a centrally apertured sheet metal cage which contains annular seats of different diameters, a washer which is fastened in the cage against the largest seat, and a packing of considerably smaller diameter than the washer which is clamped in the cage against the next seat by the inner portion of the washer, said cage having a cylindrical portion which encompasses the washer, and said washer having a flange on the outer periphery thereof which underlies the cylindrical portion of the cage.

3. As an article of manufacture, a self-contained seal for application as an assembled unit to a housing in encompassing relation to a centrally located shaft, consisting of a centrally apertured sheet metal cage which contains annular seats of different diameters, a washer which is fastened in the cage against the largest seat, and a packing of considerably smaller diameter than the washer which is clamped in the cage against the next seat by the inner portion of the washer, said cage having a cylindrical portion which encompasses the washer, said washer having a flange on the outer periphery thereof which underlies the cylindrical portion of the cage, and said cage having an inturned rim which engages with the edge of the flange on the washer.

4. As an article of manufacture, a self-contained seal for application as an assembled unit to a housing in encompassing relation to a centrally located shaft, consisting of a centrally apertured sheet metal cage which contains annular seats of different diameters, a washer which is fastened in the cage against the largest seat, and a compressible sheet leather packing of considerably smaller diameter than the washer which is clamped in the cage against the next seat by the inner portion of the washer, said seats being spaced apart a distance which corresponds approximately to the thickness of the packing when compressed.

5. As an article of manufacture, a self-contained seal for application as an assembled unit to a housing in encompassing relation to a centrally located shaft, consisting of a centrally apertured sheet metal cage having an annular seat, a cylindrical wall portion which extends axially from the outer periphery of the seat, and a second cylindrical wall portion of relatively small diameter which extends axially in the opposite direction from the inner periphery of the seat; a packing having a radially extending portion which bears against the seat and an axially extending portion which projects into the small cylindrical portion of the cage; a spring which is confined within said smaller cylindrical portion in engagement with the axially extending portion of the packing; and a washer which is positioned in the large cylindrical portion of the cage in clamped engagement with the radially extending portion of the packing and is provided about its outer periphery with an axially extending flange which forms a reinforcement for the large cylindrical portion of the cage.

6. As an article of manufacture, a self contained seal for application as an assembled unit to a housing in encompassing relation to a centrally located shaft, consisting of a centrally apertured sheet metal cup which is provided with a flat annular seat in axially spaced relation to the bottom of the same, a sheet leather packing which is positioned against said seat and is provided with an axially extending portion which projects toward the bottom of the cup, an annular spring in said bottom in engagement with the axially extending portion of the packing, and a washer clamped against the other side of the packing.

7. As an article of manufacture, a self-contained seal for application as an assembled unit to a housing in encompassing relation to a centrally located shaft, consisting of a centrally apertured sheet metal cup which is provided with a flat annular seat in axially spaced relation to the bottom of the same, a sheet leather packing which is positioned against said seat and is provided with an axially extending portion which projects toward the bottom of the cup, an annular spring in said bottom in engagement with the axially extending portion of the packing, a washer at the other side of the packing, and an inturned edge on the rim of the cup in axially locked engagement with the edge of the washer.

8. As an article of manufacture, a self-contained seal for application as an assembled unit to a housing in encompassing relation to a centrally located shaft, consisting of a centrally apertured sheet metal cage which contains annular seats of different diameters and is provided at its outer edge with an axially extending rim, a sheet metal washer of relatively heavy gauge which is fastened in the cage against the largest seat and is provided at its outer edge with an axially extending rim which fits within and is engaged by the rim of the cage, a flexible sheet packing of considerably smaller diameter than the washer provided with a radially extending portion which is clamped in the cage against the next seat by the inner portion of the washer and provided with a conical axially extending portion of substantially uniform thickness which projects toward the smallest seat and terminates in an abrupt sealing edge, and an endless coil spring which is positioned under tension about the conical portion of the packing adjacent the sealing edge thereof in substantially spaced relation to the axially extending portion and is confined against displacement by the smallest seat.

9. As an article of manufacture, a self-contained seal for application as an assembled unit to a housing in encompassing relation to a centrally located shaft, consisting of a centrally apertured sheet metal cage having an annular seat, a cylindrical wall portion which extends axially from the outer periphery of the seat and terminates in an inturned edge, and another wall portion of relatively small diameter which extends axially in the opposite direction from the inner periphery of the seat and terminates in an inwardly turned end portion; a packing which is contained wholly within the cage and has a radially extending portion which bears against the seat and an axially extending portion which projects into the small diameter portion of the cage and terminates at a point closely adjacent said inwardly turned end portion of the cage; an endless coil spring which is enclosed within said small diameter portion of the cage in engagement with the axially extending portion of the packing at the end thereof and is confined against displacement from the packing by the inturned end of the cage; and a washer which is positioned in the large cylindrical portion of the cage in clamped engagement with the radially extending portion of the packing and is provided about its outer periphery with an axially extending flange which abuts against the inturned edge on the large cylindrical portion of the cage and form a reinforcement for said large cylindrical portion.

10. As an article of manufacture, a self-contained seal for application as an assembled unit to a housing in encompassing relation to a centrally located shaft, consisting of a centrally apertured sheet metal cup which is provided with a flat annular seat in axially spaced relation to the bottom of the same, which bottom is of smaller diameter than the seat, a sheet leather packing which is positioned against said seat and is provided with an axially extending portion which projects toward the bottom of the cup and is contained wholly within the cup, an annular spring in said bottom in engagement with the end of the axially extending portion of the packing and also the bottom of the cup, a washer clamped against the other side of the packing, and means adjacent the rim of the cup for locking the washer in its clamped position.

In testimony whereof I have hereunto subscribed my name.

ALLEN F. GARDNER.